UNITED STATES PATENT OFFICE.

JOHANN HUISMANN, OF COLOGNE, GERMANY, ASSIGNOR TO SYNTHETIC PATENTS CO. INC., OF NEW YORK, N. Y., A CORPORATION OF NEW YORK.

SULFONIC ACIDS OF AROMATIC AMINOTHIAZOLES.

1,149,582.      Specification of Letters Patent.      Patented Aug. 10, 1915.

No Drawing.      Application filed June 2, 1914. Serial No. 842,459.

*To all whom it may concern:*

Be it known that I, JOHANN HUISMANN, doctor of philosophy, chemist, citizen of the German Empire, residing at Cologne-on-the-Rhine, Germany, have invented new and useful Improvements in Sulfonic Acids of Aromatic Aminothiazoles, of which the following is a specification.

The present invention relates to the manufacture and production of new aminothiazole sulfonic acids which have a sulfonic group in ortho position to the amino group. They are obtained by the baking process for instance by heating the dehydrothiotoluidin, its homologues and substitution products as well as the corresponding primulins or the known monosulfonic acids of all these compounds with sulfuric acid to high temperatures, suitably *in vacuo*. The new bodies are characterized by containing in their molecule the aggregation:

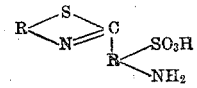

(R meaning an aryl group and the sulfonic group being in ortho position to the amino group.)

These sulfonic acids are generally yellowish crystalline compounds soluble in the shape of their alkaline salts with a bluish fluorescence in water; difficultly soluble in alcohol, ether, ligroin, benzene and forming yellowish colored diazo compounds.

In order to illustrate the new process more fully the following example is given, the parts being by weight:—320 parts of the dehydrothiotoluidin sulfonic acid of the formula

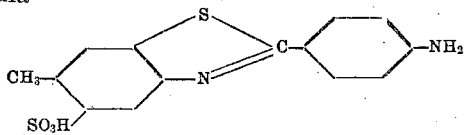

are intimately mixed with a solution of 196 parts of monohydrated sulfuric acid in water and then evaporated to dryness. The paste thus obtained is heated for several hours *in vacuo* in a vessel provided with a stirrer and a reflux condenser to temperatures of from 275–290° C. in an oil bath. When water does not distil any more the process is complete. The product is dissolved in hot water and the sulfuric acid in excess is precipitated from the solution by the addition of milk of lime. From the solution filtered off from the sulfate of lime the calcium oxid is precipitated by means of soda and the solution is then evaporated to dryness. Thus the sodium salt of a new dehydrothiotoluidin disulfonic acid is obtained in the shape of uncolored leaflets which are easily soluble in water with a pure blue fluorescence. The free dehydrothiotoluidin disulfonic acid is obtained from the sodium salt by the addition of dilute acid in the shape of crystalline yellow leaflets, soluble in water with a yellow coloration. This acid forms a yellow colored diazo compound, easily soluble in water.

The same disulfonic acid can be obtained by sulfonating with fuming sulfuric acid the dehydrothiotoluidin-mono-sulfonic acid obtained by means of the baking process from the dehydrothiotoluidin itself.

The new disulfonic acid has most probably the following formula:

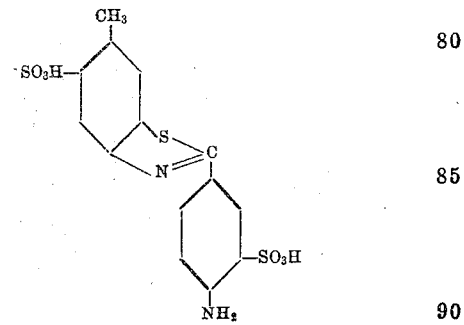

In the same way also other aromatic aminothiazole sulfonic acids, such as the dehydrothio-meta-xylidin-mono- or disulfonic acids, the primulin sulfonic acids etc. may be obtained according to the above mentioned baking process.

I claim:—

1. The herein described ortho-sulfonic acids of aromatic aminothiazole compounds containing in their molecule the aggregation:

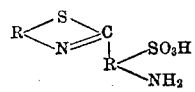

(R meaning an aryl group and the sulfonic group being in ortho position to the amino group) which are yellowish crystalline products soluble in the shape of their alkaline salts in water with a bluish fluorescence, difficultly soluble in alcohol, ether, benzene, ligroin; forming yellowish colored diazo compounds; and being valuable intermediate products for the preparation of dyestuffs, substantially as described.

2. The herein described ortho-sulfonic acids of aromatic aminothiazole compounds containing in their molecule the aggregation:

which are yellowish crystalline products soluble in the shape of their alkaline salts in water with a bluish fluorescence, difficultly soluble in alcohol, ether, benzene, ligroin; forming yellowish colored diazo compounds; and being valuable intermediate products for the preparation of dyestuffs, substantially as described.

3. The herein described ortho-sulfonic acids of aromatic aminothiazole compounds containing in their molecule the aggregation:

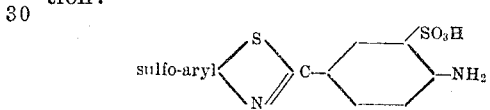

which are yellowish crystalline products soluble in the shape of their alkaline salts in water with a bluish fluorescence, difficultly soluble in alcohol, ether, benzene, ligroin; forming yellowish colored diazo compounds; and being valuable intermediate products for the preparation of dyestuffs, substantially as described.

4. The herein described ortho-sulfonic acids of aromatic aminothiazole compounds containing in their molecule the aggregation:

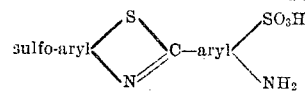

which are yellowish crystalline products soluble in the shape of their alkaline salts in water with a bluish fluorescence, difficultly soluble in alcohol, ether, benzene, ligroin; forming yellowish colored diazo compounds; and being valuable intermediate products for the preparation of dyestuffs, substantially as described.

5. The herein described dehydrothiotoluidin disulfonic acid having most probably the formula:

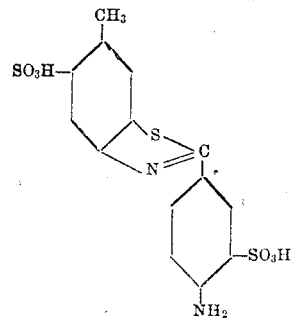

which crystallizes in yellow leaflets, soluble in water with a yellow coloration; forming a crystalline sodium salt, which is easily soluble in water with a pure blue fluorescence; and yielding a yellow colored diazo compound easily soluble in water; and having proved to be a valuable intermediate product for the preparation of dyestuffs, substantially as described.

In testimony whereof I have hereunto set my hand in the presence of two subscribing witnesses.

JOHANN HUISMANN.

Witnesses:
ANIS VANDORY,
HANS BRÜCKNER.